United States Patent
Bessis

(10) Patent No.: US 9,405,821 B1
(45) Date of Patent: Aug. 2, 2016

(54) SYSTEMS AND METHODS FOR DATA MINING AUTOMATION

(75) Inventor: David Bessis, Paris (FR)

(73) Assignee: tinyclues SAS, Paris (FR)

( * ) Notice: Subject to any disclaimer, the term of this patent is extended or adjusted under 35 U.S.C. 154(b) by 588 days.

(21) Appl. No.: 13/566,370

(22) Filed: Aug. 3, 2012

(51) Int. Cl.
*G06F 7/00* (2006.01)
*G06F 17/30* (2006.01)

(52) U.S. Cl.
CPC .... *G06F 17/30634* (2013.01); *G06F 17/30637* (2013.01); *G06F 17/30646* (2013.01); *G06F 17/30654* (2013.01)

(58) Field of Classification Search
CPC .............. G06F 17/30634; G06F 17/30637; G06F 17/30646; G06F 17/30654; G06F 17/30696; G06F 17/30964; G06F 17/30864
See application file for complete search history.

(56) References Cited

U.S. PATENT DOCUMENTS

| | | | | |
|---|---|---|---|---|
| 5,212,639 A * | 5/1993 | Sampson | ............. | G06Q 10/087 705/30 |
| 5,228,116 A * | 7/1993 | Harris | ...................... | G06N 5/02 706/47 |
| 5,305,434 A * | 4/1994 | Ballard | .............. | G09B 19/0053 715/804 |
| 5,363,507 A * | 11/1994 | Nakayama et al. | ........... | 715/743 |
| 5,475,836 A * | 12/1995 | Harris | ................ | G06F 17/30566 |
| 5,544,355 A * | 8/1996 | Chaudhuri | ........ | G06F 17/30463 |
| 5,555,404 A * | 9/1996 | Torbjørnsen et al. | | |
| 5,577,241 A * | 11/1996 | Spencer | | |
| 5,696,898 A * | 12/1997 | Baker et al. | ....................... | 726/12 |
| 5,715,453 A * | 2/1998 | Stewart | .......................... | 715/207 |
| 5,717,925 A * | 2/1998 | Harper | .............. | G06F 17/30607 |
| 5,926,807 A * | 7/1999 | Peltonen | ........... | G06F 17/30501 |
| 5,963,938 A * | 10/1999 | Wilson | .............. | G06F 17/30637 |
| 6,055,637 A * | 4/2000 | Hudson et al. | ................... | 726/20 |
| 6,063,128 A * | 5/2000 | Bentley et al. | ..................... | 703/6 |
| 6,173,273 B1 * | 1/2001 | Herbert | .............. | G07B 17/0008 705/408 |
| 6,173,279 B1 * | 1/2001 | Levin | .................. | H04M 3/4931 704/9 |
| 6,185,558 B1 * | 2/2001 | Bowman et al. | ................ | 705/37 |
| 6,327,590 B1 * | 12/2001 | Chidlovskii et al. | .......... | 707/734 |
| 6,460,050 B1 * | 10/2002 | Pace et al. | | |
| 6,629,096 B1 * | 9/2003 | Reddy | ..................... | G06N 5/022 706/46 |
| 6,948,133 B2 * | 9/2005 | Haley | ..................... | G06F 9/4443 707/999.006 |
| 6,950,831 B2 * | 9/2005 | Haley | ..................... | G06F 9/4443 |
| 7,016,532 B2 * | 3/2006 | Boncyk et al. | ................ | 382/165 |
| 7,035,843 B1 * | 4/2006 | Bellamkonda et al. | | |

(Continued)

OTHER PUBLICATIONS

Hacigumus et al, Executing SQL over Encrypted Data in the Database-Service-Provider Model, ACM 2002.*

(Continued)

*Primary Examiner* — Daniel Kuddus
(74) *Attorney, Agent, or Firm* — Ropes & Gray LLP

(57) ABSTRACT

Aspects described herein disclose an apparatus that includes a data store, where the data store stores a database, and a communication module for receiving input from a user and displaying output to the user. The apparatus further includes a processor configured to receive from the communication module a query, where the query includes a first function and a plurality of column labels. The processor is also configured to parse the query to identify the first function and a plurality of columns in the database corresponding to the plurality of column labels. The processor is further configured to apply the first function to the database to obtain a result for the query, which includes applying the first function to at least one column in the plurality of columns to dynamically create a first temporary column. The processor is further configured to send the result to the communication module.

27 Claims, 5 Drawing Sheets

(56) References Cited

U.S. PATENT DOCUMENTS

| | | | |
|---|---|---|---|
| 7,099,946 B2 * | 8/2006 | Lennon | G06F 17/30905 707/E17.121 |
| 7,130,841 B1 * | 10/2006 | Goel | G06F 17/30864 707/722 |
| 7,143,091 B2 | 11/2006 | Charnock et al. | |
| 7,171,379 B2 | 1/2007 | Menninger et al. | |
| 7,319,976 B1 | 1/2008 | Peckover | |
| 7,447,683 B2 * | 11/2008 | Quiroga et al. | |
| 7,478,120 B1 * | 1/2009 | Zhang | 709/201 |
| 7,587,387 B2 * | 9/2009 | Hogue | G06F 17/30864 |
| 7,634,463 B1 | 12/2009 | Katragadda et al. | |
| 7,644,057 B2 | 1/2010 | Nelken et al. | |
| 7,685,144 B1 | 3/2010 | Katragadda | |
| 7,752,159 B2 | 7/2010 | Nelken et al. | |
| 7,797,304 B2 * | 9/2010 | Muralidhar et al. | 707/713 |
| 7,865,404 B2 | 1/2011 | Peckover | |
| 8,005,870 B1 * | 8/2011 | Bedell | G06F 17/30398 706/45 |
| 8,239,335 B2 | 8/2012 | Schmidtler et al. | |
| 8,650,175 B2 * | 2/2014 | Hogue | G06F 17/30864 707/706 |
| 2002/0099685 A1 * | 7/2002 | Takano | G06F 17/30011 |
| 2002/0102966 A1 * | 8/2002 | Lev et al. | 455/412 |
| 2002/0194322 A1 | 12/2002 | Nagata et al. | |
| 2004/0122730 A1 | 6/2004 | Tucciarone et al. | |
| 2004/0260470 A1 | 12/2004 | Rast | |
| 2005/0060643 A1 | 3/2005 | Glass et al. | |
| 2005/0149507 A1 | 7/2005 | Nye | |
| 2005/0216503 A1 * | 9/2005 | Charlot et al. | 707/103 R |
| 2006/0015416 A1 | 1/2006 | Hoffman et al. | |
| 2006/0143081 A1 | 6/2006 | Argaiz | |
| 2007/0038516 A1 | 2/2007 | Apple et al. | |
| 2008/0065737 A1 | 3/2008 | Burke et al. | |
| 2008/0073427 A1 | 3/2008 | Voigt | |
| 2008/0086433 A1 | 4/2008 | Schmidtler et al. | |
| 2009/0043773 A1 * | 2/2009 | Frazier et al. | 707/9 |
| 2009/0119289 A1 | 5/2009 | Gibbs et al. | |
| 2009/0119376 A1 | 5/2009 | Bomma | |
| 2009/0148048 A1 | 6/2009 | Hosomi | |
| 2009/0240949 A9 | 9/2009 | Kitchens et al. | |
| 2009/0254417 A1 | 10/2009 | Beilby et al. | |
| 2010/0010816 A1 | 1/2010 | Bells et al. | |
| 2010/0262282 A1 | 10/2010 | Segal et al. | |
| 2010/0312837 A1 | 12/2010 | Bodapati et al. | |
| 2010/0324927 A1 | 12/2010 | Tinsley | |
| 2011/0082843 A1 * | 4/2011 | Kashiwagi et al. | 707/693 |
| 2012/0303559 A1 | 11/2012 | Dolan | |

OTHER PUBLICATIONS

Einat Minkov et al., "Extracting Personal Names from Email: Applying Named Entity Recognition to Informal Text", Proceedings of Human Language Technology Conference and Conference on Empirical Methods in Natural Language Proceeding (HLT/EMNLP), pp. 443-450, Vancouver, Oct. 2005. (c) Association for Computational Linguistics.

* cited by examiner

|  | 302a | 302b | 302c | 302d | 302e |
|---|---|---|---|---|---|
|  | ID | firstname | gender | age | favoriteproduct |
| 304a | 1 | Alice | F | 23 | perfume |
| 304b | 2 | John | M | 42 |  |
| 304c | 3 | Cindy | F | 51 |  |
| 304d | 4 | John | F | 47 | video games |
| 304e | 5 | Patricia |  | 35 |  |
| | ⋮ | ⋮ | ⋮ | ⋮ | ⋮ |

User["most_frequent(firstname,axis='gender')"]

402 — most_frequent
404 — firstname
406 — axis='gender'

User["fav_product(age,most_frequent(firstname,axis='gender'),
axis='favoriteproduct')"]

408 — fav_product
410 — age
402 — most_frequent
404 — firstname
406 — axis='gender'
412 — axis='favoriteproduct'

FIG. 4B

SYSTEMS AND METHODS FOR DATA MINING AUTOMATION

BACKGROUND

Databases are used to hold and arrange vast amounts of information. This information may be analyzed and manipulated to provide insights, patterns, and predictions regarding the data in the database. For example, in many business and commercial fields companies attempt to leverage the information they have about their customer base in order to increase sales or business to those customers. This information may include databases of different attributes for each customer, e.g. full name, address, gender, age, hobbies, interests, and buying patterns. Data mining or machine learning may be used to extract derivative information from databases. Data mining or machine learning includes the analysis of large quantities of data to extract previously unknown interesting patterns or dependencies within the data. These analytical approaches may also be useful in filling in gaps of data within the database or predicting additional data points.

Databases are usually stored on one or more computing devices, such as servers. Users access and interact with databases using a database query language, such as SQL. Database query languages allow users to read data from the database and write data to the database, as well as perform certain functions on the data. Simple data analysis may be accomplished using query languages known in the art. However, it is difficult to use known query languages to accomplish more complex analytical tasks such as data mining. For example, a user first has to develop a model that accomplishes the data mining operation, train the model, and then apply the model to the data set. Users may have to write long query language scripts in order to accomplish data mining tasks. This requires a lot of time as well as in-depth knowledge of data mining analytical processes and query languages. Thus, there exists a need in the art to develop a simpler way for users to interface with databases to perform data mining operations.

SUMMARY

An organization may have one or more databases storing multiple data sets. Any given data set is unique and holds a large amount of related data, e.g., customer data for a particular business. Since a database varies based on the data contained within it, the information obtainable through data mining the database also varies. Thus any data mining models developed for a particular data set may not be easily applied to other data sets because of the variance of the amount and type of data. A function library may be created for a data set, where each function represents a data mining model that may be applied to that particular data set. A query language is used to call the functions and a user interface allows the user to apply one or more data mining functions to the data set. The data mining functions may be very complex and may involve recursive application of models, but the query language allows users to utilize such functions without engaging in the complex intermediate steps of developing, training, and applying the model. Thus the user interface, query language, and data mining function library automates the data mining process. This data mining automation allows any person within an organization to perform data mining operations on a database without requiring specialized knowledge of data mining analysis.

Aspects described herein disclose systems and methods of data mining automation. In one aspect, an information processing system is described which includes a data store arranged to store data and store a plurality of functions for processing portions of the data, each of the plurality of functions being assigned a function identifier, and the data being arranged in a plurality of groups, each group of data being assigned a group identifier. The system further includes an interface arranged to receive a query, the query including at least one group identifier and at least one function identifier. The system further includes a processor arranged to i) receive the query from the interface, ii) identify the at least one group identifier and the at least one function identifier, iii) retrieve, from the data store, data associated with the at least one group identifier, iv) retrieve from the data store at least one function associated with the at least one function identifier, and v) generate a resulting group of data based on executing the at least one function on a portion of the data associated with the at least one group identifier.

The group identifier in the query may include a sub-query, where the sub-query includes at least one additional group identifier and at least one additional function identifier. The processor identifies the at least one additional group identifier and the at least one additional function identifier. The processor may also execute the at least one function and the at least one additional function recursively such that the at least one additional function is executed first and the at least one function is executed second. The processor executes the at least one function on data derived from executing the at least one additional function.

The interface of the system may be arranged to output a portion of the resulting group of data. The interface may include a user interface. The process may also compare the at least one group identifier with a list of known group identifiers in the data store. The processor may also compare the at least one function identifier with a list of known function identifiers in the data store. The query may be compared with the list of known group identifiers first and then comparing the query with the list of known function identifiers if a match with the known group identifiers is not determined. At least one function of the plurality of functions may include a trained model, and the model may be trained in response to receiving the query. The group of data may include a column of a database, and the column may arrange the group of data in a predefined order. The resulting group of data may be stored in the data store.

Another aspect described herein discloses a method of information processing, where the method includes storing data in a data store, the data being arranged in a plurality of groups, each group of data being assigned a group identifier. The method further includes storing a plurality of functions in the data store, the plurality of functions for processing portions of the data, each of the plurality of functions being assigned a function identifier. The method further includes receiving a query, the query including at least one group identifier and at least one function identifier, and identifying the at least one group identifier and the at least one function identifier. The method further includes retrieving, from the data store, data associated with the at least one group identifier, and retrieving at least one function associated with the at least one function identifier. The method further includes generating a resulting group of data based on executing the at least one function on a portion of the data associated with the at least one group identifier.

The group identifier in the query may include a sub-query, where the sub-query includes at least one additional group identifier and at least one additional function identifier. The processor identifies the at least one additional group identifier and the at least one additional function identifier. The method may also include executing the at least one function and the at least one additional function recursively such that the at least one additional function is executed first and the at least one function is executed second. The method may include executing the at least one function on data derived from executing the at least one additional function.

Another aspect described herein discloses an apparatus for performing data-mining in a database, the apparatus including a data store, where the data store stores a database, and a communication module for receiving input from a user and displaying output to the user. The apparatus further includes a processor configured to receive from the communication module a query, where the query includes a first function and a plurality of column labels. The processor is also configured to parse the query to identify the first function and a plurality of columns in the database corresponding to the plurality of column labels. The processor is further configured to apply the first function to the database to obtain a result for the query, which includes applying the first function to at least one column in the plurality of columns to dynamically create a first temporary column. The processor is further configured to send the result to the communication module.

The query may further include a second function within the first function, and the second function is applied to at least one column in the plurality of columns to dynamically create a second temporary column. The data store may store a library of functions. The processor may be configured to train the first function on a training data set. The processor may be configured to train the first function on a training data set. A portion of the database may include the training data set. The parsing may include selecting the first function from a library of functions. The result may include a portion of the first temporary column. Only the portion of the first temporary column may be created to obtain the result.

Another aspect described herein discloses a method of performing data-mining in a database, the method including receiving from a user a query for a database, where the query includes a first function and a plurality of column labels. The method further includes parsing the query to identify the first function and a plurality of columns in the database corresponding to the plurality of column labels. The method further includes applying the first function to the database to obtain a result for the query, wherein the applying comprises applying the first function to at least one column in the plurality of columns to dynamically create a first temporary column. The method further includes returning the result to the user.

The query may further include a second function within the first function, and the second function is applied to at least one column in the plurality of columns to dynamically create a second temporary column.

BRIEF DESCRIPTION OF THE FIGURES

The methods and systems may be better understood from the following illustrative description with reference to the following drawings in which:

FIG. 3 shows a sample database data set stored in a data store in accordance with an implementation as described herein;

FIGS. 4A and 4B show database queries including data mining operations in accordance with an implementation as described herein;

DETAILED DESCRIPTION

To provide an overall understanding of the systems and methods described herein, certain illustrative embodiments will now be described, including systems and methods for data mining automation. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Aspects of the systems and methods described herein allow users to more easily perform data mining operations on databases. A query language and user interface system allows a user to enter a single query to initiate one or more data mining operations. A function library is developed for a data set stored in the database, where the functions represent data mining operations. A user can call one or more functions using the query language and apply them to the data stored in the database. Applying a function to a database includes identifying the functions and data inputs from the query and making one or more calculations on the data input in accordance with the functions. The functions are defined beforehand so there is no need for a user to define a model every time a data mining operation is desired. Also, the functions may be trained beforehand, or may be trained at the time the function is called. In either case, the user does not have to manually train the function. Thus the query language, function library, and user interface allow any user to easily initiate data mining operations.

Figure 1:
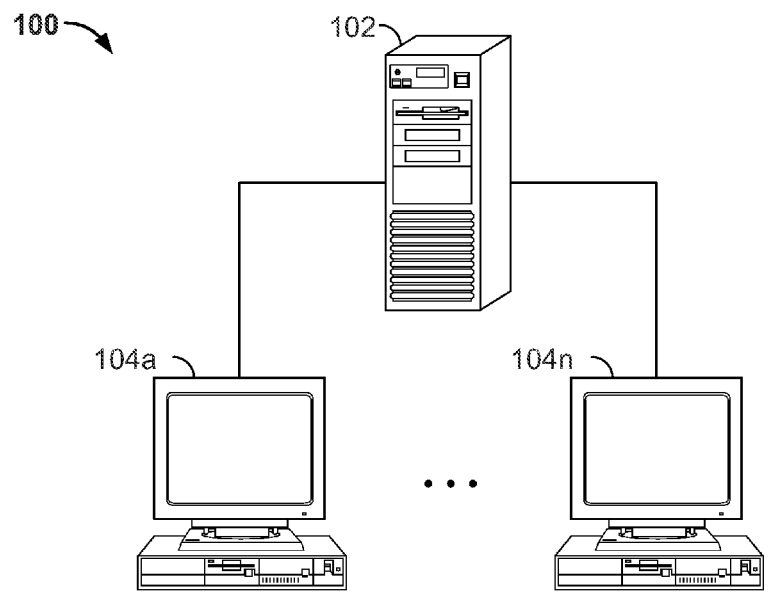
FIG. 1 shows a client-server system for performing data mining operations on a database stored on the server in accordance with an implementation as described herein.

Systems and methods for data mining automation are herein described. Data mining operations are performed on data sets stored in databases. Databases are stored in memory on electronic devices, which are accessible by users through a user interface. Given the large amount of data that many organizations store, databases are generally stored on servers and users access the databases over a network. A general client-server system 100 for providing access to a database is shown in FIG. 1. The system includes server 102 and any number of client devices 104a through 104n. Client devices may be desktop computers, laptop computers, handheld computing devices, or any other type of electronic device. Client devices 104a through 104n may communicate with server 102 through a variety of means, such as through a local area network (LAN), wide area network (WAN), an Internet connection, or any other type of network connection. Server 102 may encompass one or more computing devices that store the database and provide clients access to the database. For example, server 102 may include a gateway server for monitoring connections with client devices 104a and 104n and multiple database servers for storing the data. Server 102 may also include user interfaces for a local user to interact with the database.

Figure 2:
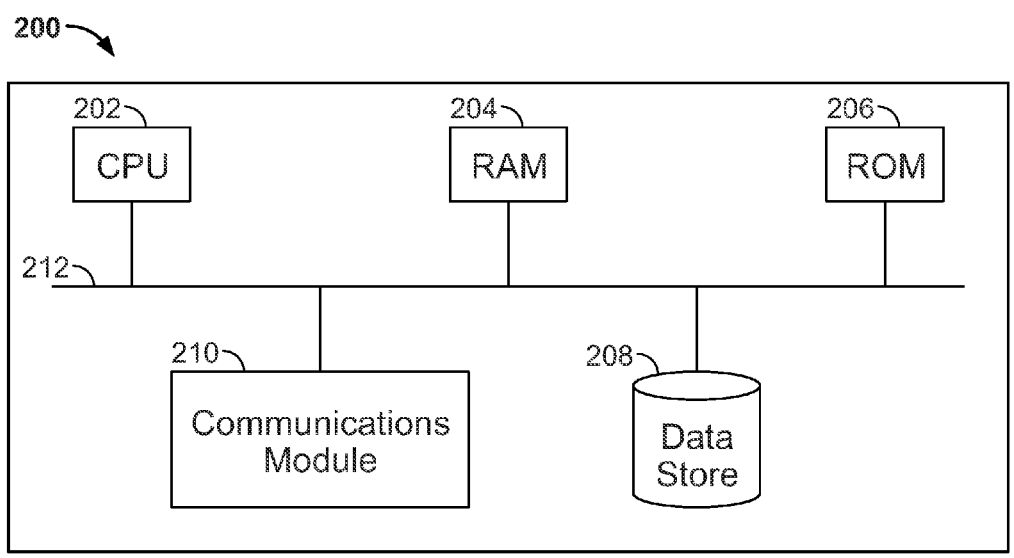
FIG. 2 shows a database server architecture accessible for performing data mining operations in accordance with an implementation as described herein.

The server in a client-server system usually stores the database and controls access to the database by various users through a user interface. An example of a server for storing a database and controlling access by users is shown in FIG. 2. Server 200 includes a central processing unit (CPU) 202, random access memory (RAM) 204, read only memory (ROM) 206, data store 208, communications module 210, and bus 212. Server computer 200 may have additional components that are not illustrated in FIG. 2. Bus 212 allows the various components of server 200 to communicate with each other. Communications module 210 allows the server 200 to communicate with other devices, such as client computers or other servers. Communications module 210 may also connect to input and output devices such as a monitor, keyboard, and mouse to allow a user to directly interact with the server. Data store 208 may store, among other things, one or more databases and one or more functions for analyzing the databases. The storage of a database is not limited to a single server as illustrated in FIG. 2. A database may be stored on multiple computing devices, and CPU 202 and communication module 210 are used to access the database that is spread out among the multiple computing devices. CPU 202 may also be configured to present a user interface to a client computer for accessing the data store and performing data mining operations thereon. CPU 202 may also execute a syntax parser program. The syntax parser allows the server to parse database queries and identify its constituent components.

Data store 208 for storing databases may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Servers, such as described above, allow users to perform data mining operations on the database stored in the data store. Data mining operations in accordance with the systems and methods described herein rely on certain attributes of a database stored in a data store. These attributes are discussed in relation to FIG. 3, which shows a representation of a portion of a database. Database 300 includes a number of columns 302a through 302e and a number of rows 304a through 304e. Database 300 may contain any number of columns and rows and is not limited to what is illustrated in FIG. 3. Database 300 may be a column-oriented database, which means that the data tables are stored as columns rather than rows. Columns 302a through 302e each have group identifiers, or column labels, associated with them. The group identifiers may be used to identify the type of data stored in that column. For example, in database 300 the group identifiers are "ID," "firstname," "gender," "age," and "favoriteproduct". Each row 304a through 304e contains the group identifier information for an associated data set. For example, for ID=1, the first name is "Alice", the gender is "F", the age is "23", and the favorite product is "perfume". Row 304a then describes a 23 year old female with the first name of Alice and whose favorite product is perfume. Database 300 may contain additional columns that are useful for data mining analysis, such as location, profession, or purchasing history.

A user may access the data in database 300 using a query language. A user may read all the contents of a column by sending a read request that includes the group identifier. For example, a read request such as user["firstname"] returns the contents of column 304b: ["Alice", "John", "Cindy", "John", "Patricia", . . . ]. A user may also send write requests to edit or enter new data into database 300.

Data mining operations, such as interpolating data or making predictions based on data, may also be performed using the data stored in database 300. One data mining operation that may be performed on database 300 is to correct errors in the database or fill in missing information. For example, rows 304b, 304c, and 304e of database 300 are missing information under group identifier "favoriteproduct" and row 304e is missing information under group identifier "gender". Also, in column 304d the first name is listed as "John" while the gender is listed as "F", which seems to be an unlikely combination. One possible way of correcting or filling in missing information in the "gender" column is by using the "firstname" column as a reference to construct a model of the gender that is most frequently associated with each first name. The model is defined as a function and trained on a sample data set using a training function. Training the model allows the model to collect data based on a data set that is similar to the data contained in database 300, which allows the model to more accurately determine the likely gender of a given first name. Once the model as been trained, it is applied to database 300. The model function would take as an input the group identifier "firstname" and determine the gender that is most frequently associated with it. A new column is appended to database 300 with the corrected gender for each first name, and the new column is outputted to the user. Database query languages known in the art may be used to accomplish data mining, but the process is cumbersome. Using conventional database query languages, this process is complex and includes multiple steps—defining a model, training the model, applying the model to the data, creating a new column to store the result, and outputting the result.

Aspects of the systems and methods described herein allow users to perform data mining operations on databases in a more straight-forward fashion. A query language and user interface system is established so that a single query may accomplish the data mining operation described above. A function library is developed for the data set stored in the database, where the functions include models for data mining operations. A user can call one or more functions using the query language and apply them to the data stored in the database. Thus the query language, function library, and user interface allow any user to easily initiate data mining operations.

FIG. 4A shows an example of a database query calling a data mining function in accordance with the systems and methods described herein. Query 400A is a database query that includes a function identifier 402, group identifier 404, and axis 406. The function identifier "most_frequent" is associated with the gender correction model, which is stored in a function library (for example, on a server). The function takes as input a group of data associated with group identifier 404, in this case "firstname", and an axis 406. The axis 406 is used to note the group of data that will be used to train the function, in this case "gender". When query 400A is entered by a user, a syntax parser first parses the query to identify the function identifiers, group identifiers, and axes. The function associated with the function identifier is called and, if not already trained, the function is trained using a training data set. The function is then applied to the group of data associated with group identifier 404, and then the result is outputted to a user. For example, if group identifier 404 is associated with column 302b in FIG. 3 and axis 406 is associated with column 302c in FIG. 3, the output would be ["F", "M", "F", "M", "F" . . . ]. Note that the gender of the second "John" in row 304d of FIG. 3 would be corrected from "F" to "M" since the function would likely correlate the name John with the male gender. Thus a single query 400A accomplishes the tasks described in the previous paragraph, namely defining a model, training the model, applying the model to the data, and outputting the result. This makes it simpler for users to accomplish data mining operations because users only need to call functions and columns in the query—the user does not have to be involved with building, training, or applying the model.

The output of query 400A is dynamically created during the processing of the function. In addition, the output is not stored in the database as a new column, but rather stored in temporary memory. In the conventional method of implementing data mining operations, the corrected gender would be added to the database as a new column. When query 400A is used, the corrected genders are generated and stored as a dynamically created column in temporary system memory but the underlying database is not changed. A dynamically created column is defined by an ordered list of input columns, and a line-by-line function that maps a list of entries in the input columns to the corresponding entry in the dynamically created column. Thus the query is dynamically interpreted by the system and calculates and returns a temporary column with the results of the data mining operation.

FIG. 4B shows another query 400B in accordance with the systems and methods described herein. Query 400B includes function identifier 408, group identifier 410, axis 412, and query 400A embedded within query 400B. Query 400B is thus an example of a recursive application of a model, where query 400B calls sub-query 400A as part of its calculation. In this example, function identifier 408 is labeled "fav_product" and is associated with a model that predicts a person's favorite product based on the person's age and gender. This function may be stored in a function library, along with the "most_frequent" function. Function identifier 408 takes as input the group identifier "age" 408, a group identifier associated with gender, and axis 412, which includes group identifier "favoriteproduct". The group identifier associated with gender may itself be another function identifier which returns a set of gender-related data. In query 400B, the group identifier for gender is the function identifier "most_frequent" that is associated with a gender correction model. The output of function identifier "most_frequent" is a column of corrected genders, so it is similar to calling group identifier "gender". Thus query 400B would process the gender correction model first and then use the result to apply the "fav_product" model to return a column of predicted favorite products. Like query 400A, the output of query 400B is dynamically generated and so the underlying database is not altered. Thus a user may use a single query 400B to implement a complex data mining operation that involves the use of two or more models.

The functions or models associated with the function identifiers may be stored in a function library. The functions are defined beforehand, but may be trained beforehand as well or at the time a query is received and processed. Methods of training models are known in the art, such as collecting statistics from a training data set that resembles the relevant data set applicable to the function. The function library may be stored on the same server as the database, or on another connected computing device. The server may also store one or more training data sets to train the functions. A syntax parser program may also be stored on the server. The syntax parser allows the server to identify the function identifiers, group identifiers, and axes that are present in a query.

Figure 5:
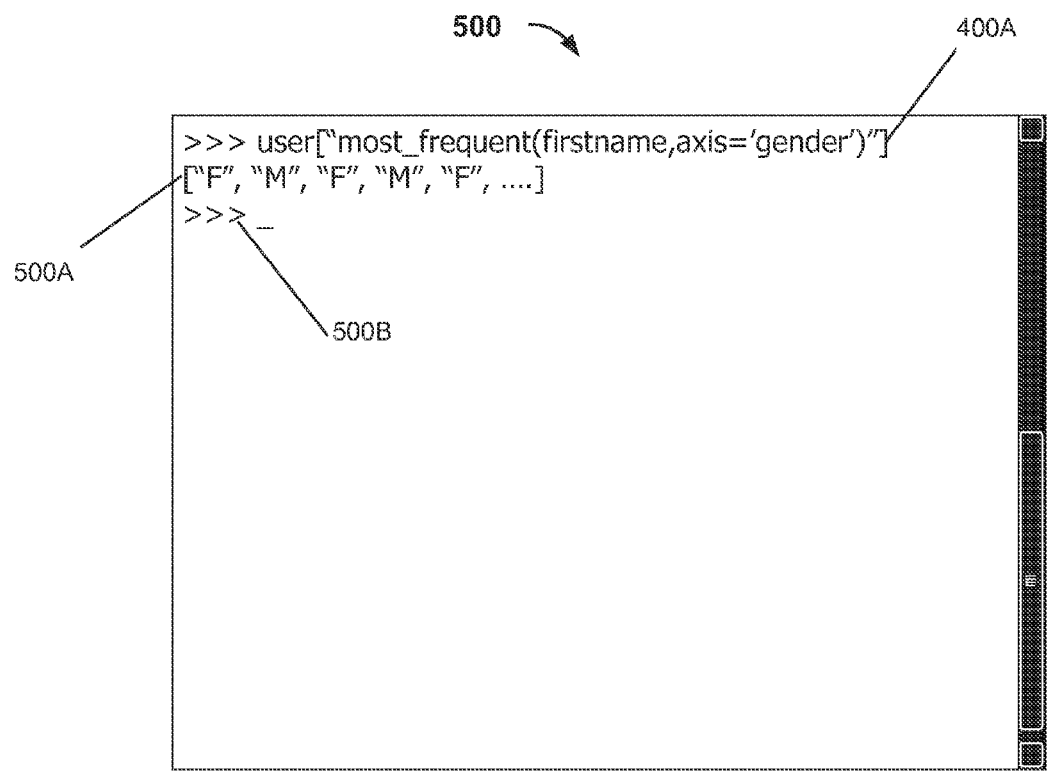
FIG. 5 shows a user interface for inputting database queries in accordance with an implementation as described herein.

An interface is used to provide users with a way of performing data mining operations with the data stored on the server. The interface takes input, such as database queries, from the user and outputs the results of those queries. FIG. 5 shows an example of a text-based user interface that can be implemented in accordance with the systems and methods described herein.

User interface 500 is a text window in which users can type queries. The symbols ">>>" denote a command prompt 500B where the user can type queries. Once a query is entered, the server receives the query, parses it, and executes the query using data stored in a data store controlled by the server. The user interface displays the output of the queries below the input. Thus in interface 500, the user has input query 400A from FIG. 4A into the user interface and the output 500A ["F", "M", "F", "M", "F" . . . ] is displayed below the query. Interfaces compatible with the systems and methods described herein are not limited to the text-based interface shown in FIG. 5. Other interfaces can include graphical user interfaces, interfaces that make use of buttons, text fields, drop-down menus, charts, or graphs, and other user interfaces that are known in the art.

Figure 6:
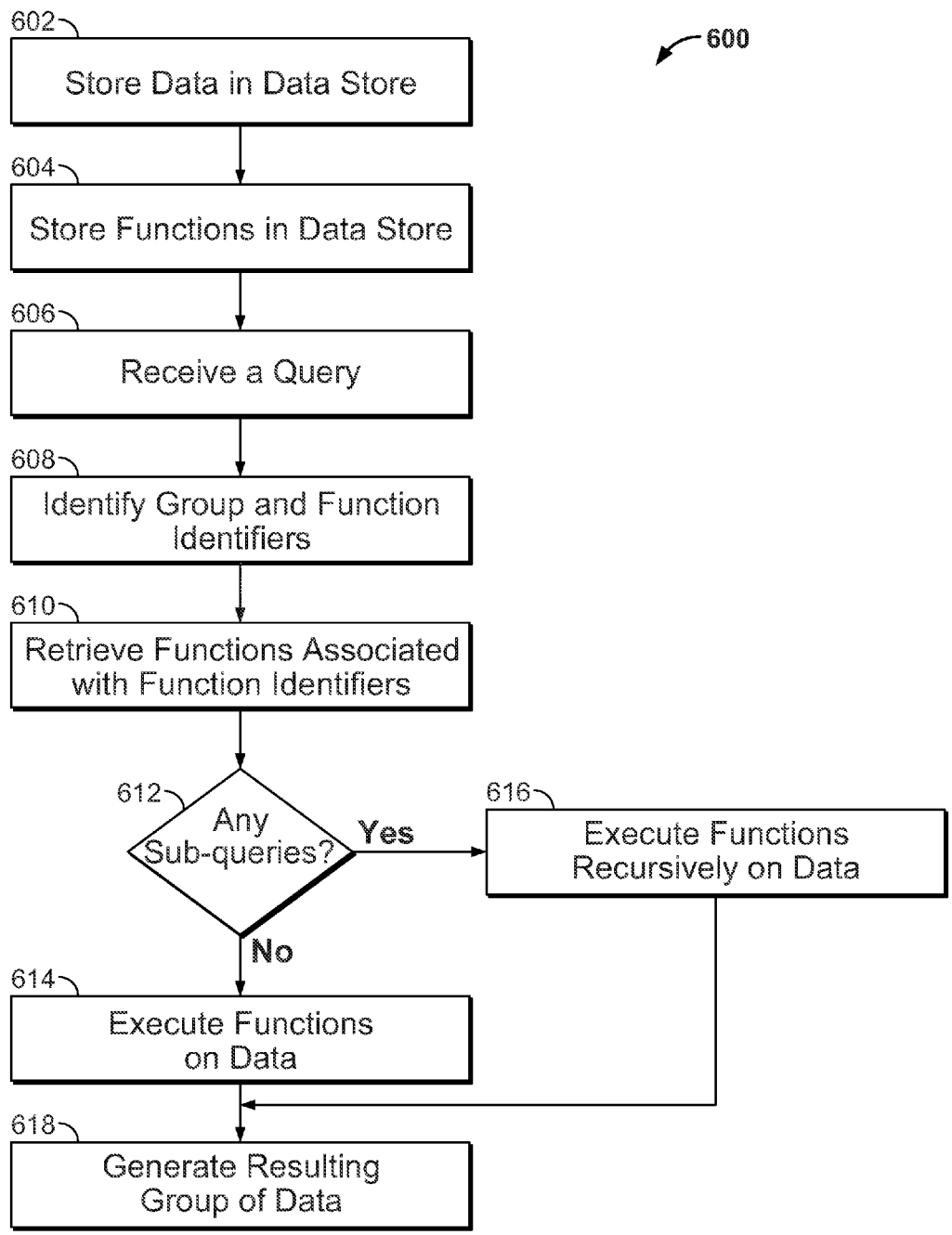
FIG. 6 shows a method of data mining automation in accordance with an implementation as described herein.

From the client perspective, a user only need to enter a single database query through an interface to perform data mining operations. The server processes the query and engages in the multiple steps involved in data mining without further input from the user. FIG. 6 illustrates a method of data mining automation implemented by a server based on the interface and query language described above. Method 600 includes storing data and functions in a data store. The method further includes receiving a query and identifying the function identifiers, group identifiers, and axes within the query. The method further includes retrieving the functions associated with the function identifiers and executing the functions, including executing the functions recursively if the query is structured as such. Lastly, the method further includes generating a resulting group of data from the functions and outputting the result. Method 600 is completed in accordance with all data privacy or other applicable laws.

Method 600 may be implemented on a number of computing systems, such as client-server system 100 illustrated in FIG. 1. One way of implementing method 600 is using a server that has a processor, a data store for storing a database, and an interface for receiving input from a user and displaying output to the user. However, the actual arrangement of hardware is not limited to what is described herein but may include any arrangement known to persons having ordinary skill in the art. The data store may store one or more databases that may be queried.

Method 600 begins with storing data in a data store, illustrated as step 602. For example, a server such as server 200 in FIG. 2 may include a data store for storing data. The data store may arrange the data in a column-oriented database, where each column is associated with a group identifier. Other methods of data organization, such as relational databases, may also be compatible with method 600. The data store may arrange the data in a predefined order within the database, or in an order specified by a user. The data store allows users access to the data through a database query language in accordance with the systems and methods described herein. In step 604, functions are stored in the data store. These functions may be models that may be applied to the data stored in the data store. The functions are developed beforehand and may be stored in a function library within the data store. A user may call the functions using queries to perform data mining operations on the data. Each function is associated with a function identifier.

After the data and functions have been stored in the data store, users may query the data store and perform data mining operations. In step 606, a server receives a query from a user. The server or a client computer connected to the server may have an interface that allows a user to enter queries to be processed by the server. For example, a graphical or text-based user interface is implemented to provide input and output for the database system. The query submitted by a user includes one or more function identifiers, one or more group identifiers, and one or more axes. The query may also contain other information, such as instructions for displaying or storing the output, or limits on how many data points should be calculated for the output. Examples of queries that may be received are shown in FIGS. 4A and 4B. The queries embody one or more data mining operations that the user intends to perform on the data in the data store. The query may also encompass data stored on multiple discrete databases.

After the server receives the query, in step 608 the function identifiers, group identifiers, and axes are identified from the query. The server may use a syntax parser that analyzes the query and identifies the character strings within the query that are function identifiers, group identifiers, and axes. The data store may have a list of known function identifiers and group identifiers that the syntax parser may use to determine if a character string is a recognized identifier. In some embodiments, the group identifiers may be identified without using a syntax parser, but the syntax parser is called if the query contains a character string that does not correspond to a group identifier. The syntax parser checks if the character string is a function identifier, in which case the system knows that the query is a data mining operation and not a simple database access command. For example, if the server receives query 400A in FIG. 4A, the syntax parser would identify "most_frequent" as the function identifier, "firstname" and "gender" as the group identifiers, and would identify the axis as associated with "gender". If the server receives query 400B in FIG. 4B, the syntax parser would identify "fav_product" and "most_frequent" as the function identifiers, "age", "firstname", "gender", and "favoriteproduct" as the group identifiers, and would identify the axes as associated with "gender" for "most_frequent" and "favoriteproduct" for "fav_product".

After the query is parsed into its constituent elements, in step 610 the functions associated with the function identifiers are retrieved. For example, if a user enters query 400B in FIG. 4B, the function identifiers "most_frequent" and "fav_product" are identified and the server would search the function library for the functions associated with those function identifiers and retrieve them.

Once all the functions are retrieved, the functions are executed with the groups of data associated with the group identifiers used as inputs to the function. A processor on the server takes the data inputs and performs data calculations or manipulations as specified by the instructions of the function. In step 612, the server checks if the query has any sub-queries embedded in it, like query 400B illustrated in FIG. 4B. If the function has another function embedded inside of it, then the embedded function is executed first, illustrated in step 616. For example, if query 400B is being processed, the function with function identifier "most_frequent" is executed first. The resulting output of the function is then used as an input to the function with function identifier "fav_product". In general, a query may include any number of sub-queries, and there may be any number of levels of recursion depending on how the query is structured. If there are no sub-queries, the server executes the functions as normal, illustrated in step 614. When the trained function is applied to the data, dynamically created columns are used to store the result. These dynamic columns are not saved as part of the database in the data store but are stored in temporary memory. In some cases, lazy evaluation is used to speed up the processing time of the function. In lazy evaluation, only a portion of the dynamically created column is calculated. Thus portions of the dynamically created column that are not calculated may be calculated at a later time when the user needs it or may not be calculated at all.

Once all the functions have completed execution, a resulting group of data is generated based on the functions. This is illustrated in step 618. This resulting group of data is the output of the functions and contains the result of the query. The resulting group of data may be, for example, the dynamically created columns generated during the execution of the function. In other situations, other operations may be applied to the dynamically created columns to generate the resulting group of data. The resulting group of data may be outputted to be viewed by a user, or may also be appended to the database as an additional column, exported into another format, or any number of other operations that a user may decide. For example, a user may structure the query as user["corrected_gender"]=user["most_frequent(firstname, axis='gender')"] to add the result of the query as a new column in the database, with new group identifier "corrected_gender". The server may then accept another user query. Multiple users may be accessing the database at the same time, and so the server may handle multiple queries at any given moment. Thus, method 600 illustrates an example of data mining automation in which a user may implement one or more data mining operations using a single database query.

Figure 7:
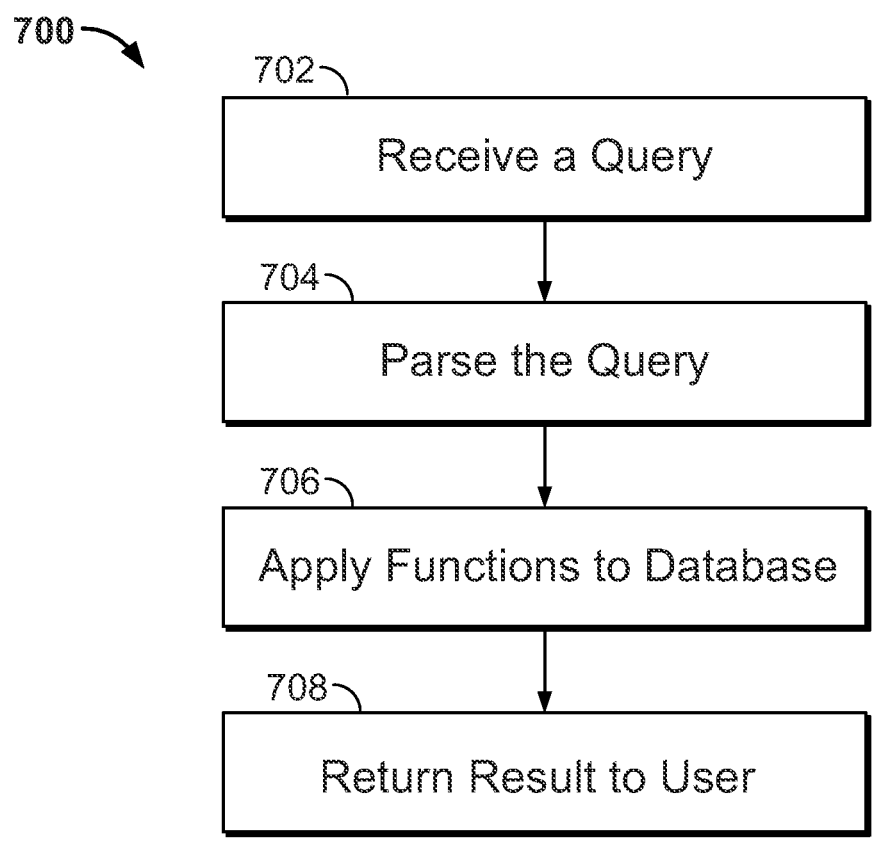
FIG. 7 shows another method of data mining automation in accordance with an implementation as described herein.

In a column-oriented database, the data mining functions may take as input one or more columns of the database and generate one or more dynamically created columns as output. FIG. 7 illustrates one such method for performing data mining in a column-oriented database. The method may be performed on various computing systems, such as the client-server system illustrated in FIG. 1. Method 700 includes receiving from a user a query for a database, the query including a first function and a plurality of column labels. The method further includes parsing the query to identify the first function and a plurality of columns in the database corresponding to the plurality of column labels. The method further includes applying the first function to the database to obtain a result for the query by applying the first function to at least one column in the plurality of columns to dynamically create a first temporary column. Finally, the result is returned to the user. Method 700 is completed in accordance with all data privacy or other applicable laws.

Method 700 may be implemented on a number of computing systems, such as client-server system 100 illustrated in FIG. 1. A server with a processor, data store for storing a database and a communication module for receiving input from a user and display output to the user may be used to implement method 700. However, the actual arrangement of hardware is not limited to what is described herein but may include any arrangement known to persons having ordinary skill in the art. The data store may store one or more databases that may be queried.

Method 700 begins receiving a database query from a user, illustrated as step 702. The query contains at least one function and at least one column label. The function implements a model for a data mining operation. The query may encompass data stored on one or more discrete databases. Examples of queries incorporating data mining models are illustrated in FIGS. 4A and 4B. The database may be stored in the data store as a column-oriented database, with column labels used to denote the columns in the database. The data store may arrange the data in a predefined order within the database, or in an order specified by a user. The data store allows users access to the data through a database query language in accordance with the systems and methods described herein. The data store may also store a library of functions that may be called and executed by a query. The functions stored in the library are predefined and may be trained beforehand or at the time the function is retrieved by a query.

After the query has been received, the query is parsed, as illustrated in step 704. The server may use a syntax parser that analyzes the query and identifies the character strings within the query that correspond to functions and column labels. The server may then look up the functions in the function library. In some embodiments, the column labels may be identified without using a syntax parser, but the syntax parser is called if the query contains a character string that does not correspond to a column label. The syntax parser checks if the character string is a function, in which case the system knows that the query is a data mining operation and not a simple database access command. For example, if the server receives query 400A in FIG. 4A, the syntax parser would identify "most_frequent" as the function, "firstname" and "gender" as the column labels. If the server receives query 400B in FIG. 4B, the syntax parser would identify "fav_product" and "most_frequent" as the functions, "age", "firstname", "gender", and "favoriteproduct" as the column labels. Once the query has been parsed, the server may retrieve the functions from the function library and the columns in the database that correspond to the column labels. If the retrieved functions have not yet been trained, the method may also include training the functions. A training data set that is similar to the data contained in the database may be used to train the function, or the function may be trained using a portion of the database itself.

After the server parses the query, the server applies the function to the database, illustrated as step 706. This step includes taking as input one ore more columns stored in the database as specified by the query and executing one or more instructions in the function on the data input to obtain an output. The function inputs are columns of the database corresponding to the column labels in the query. Functions may also have additional functions as input variables. If the query contains recursive functions, like query 400B in FIG. 4B, the inner function is executed first. The output of the inner function is used as an input to the outer function. For example, if query 400B is being processed, the function "most_frequent" is executed first. The resulting output of the function is then used as an input to the function "fav_product". In general, a query may include any number of sub-queries, and there may be any number of levels of recursion depending on how the query is structured. During the application of a trained function to the data in the database, the processor generates one or more dynamically created columns. These dynamically created columns are the result of executing one or more instructions in the function on one or more columns stored in the database. The dynamically created columns are not saved as part of the database in the data store but are stored in temporary memory. In some cases, lazy evaluation is used to speed up the processing time of the function. In lazy evaluation, only a portion of the dynamically created column is calculated. Thus portions of the dynamically created column that are not calculated may be calculated at a later time when the user needs it or may not be calculated at all.

After the server applies the function to the database, the result is returned, illustrated in step 708. The result may be all or a portion of the dynamically created columns described above. The result may be sent to the communication module of the server for output to the user, or may also be appended to the database as an additional column, exported into another format, or any number of other operations that a user may decide. For example, a user may structure the query as user["corrected_gender"]=user["most_frequent(firstname, axis='gender')"] to add the result of the query as a new column in the database, with new group identifier "corrected_gender". The server may accept another user query. Multiple users may be accessing the database at the same time, and so the server may handle multiple queries at any given moment. Thus method 700 illustrates an example of data mining automation in which a user may implement one or more data mining operations using a single database query.

It will be apparent to one of ordinary skill in the art that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. An information processing system comprising:
    a data store arranged to store data and store a plurality of functions for processing portions of the data, each of the plurality of functions being assigned a function identifier, the data being arranged in a plurality of groups, each group of data being assigned a group identifier;
    an interface arranged to receive a single query, the single query including at least one group identifier and at least one function identifier; and
    a processor arranged to i) receive the single query from the interface, and in response to the single query, without further user input:
    ii) identify the at least one group identifier and the at least one function identifier, iii) retrieve, from the data store, data associated with the at least one group identifier, iv) retrieve from the data store at least one function associated with the at least one function identifier, and v) generate a resulting group of data based on executing the at least one function on a portion of the data associated with the at least one group identifier, wherein identifying includes comparing the query with a list of group identifiers first and when a match with group identifiers from the list of group identifiers is not determined comparing the query with a list of function identifiers.

2. The system of claim 1, wherein the at least one group identifier comprises a sub-query, wherein the sub-query includes at least one additional group identifier and at least one additional function identifier.

3. The system of claim 2, wherein the processor identifies the at least one additional group identifier and the at least one additional function identifier.

4. The system of claim 3, wherein the processor executes the at least one function and the at least one additional function recursively, wherein the at least one additional function is executed first and the at least one function is executed second.

5. The system of claim 4, wherein the processor executes the at least one function on data derived from executing the at least one additional function.

6. The system of claim 1, wherein the interface is arranged to output a portion of the resulting group of data.

7. The system of claim 1, wherein the interface includes a user interface.

8. The system of claim 1, wherein identifying includes comparing the at least one group identifier with a list of group identifiers in the data store.

9. The system of claim 1, wherein identifying includes comparing the at least one function identifier with the list of function identifiers in the data store.

10. The system of claim 1, wherein at least one function of the plurality of functions includes a trained model.

11. The system of claim 10, wherein the model is trained in response to receiving the query.

12. The system of claim 1, wherein a group of data includes a column of a database.

13. The system of claim 12, wherein the column arranges the group of data in a predefined order.

14. The system of claim 1, wherein generating includes storing the resulting group of data in the data store.

15. A method of information processing comprising:
  storing data in a data store, the data being arranged in a plurality of groups, each group of data being assigned a group identifier;
  storing a plurality of functions in the data store, the plurality of functions for processing portions of the data, each of the plurality of functions being assigned a function identifier, receiving a single query, the single query including at least one group identifier and at least one function identifier, and in response to receiving the single query, without further user input:
    identifying the at least one group identifier and the at least one function identifier;
    retrieving, from the data store, data associated with the at least one group identifier;
    retrieving at least one function associated with the at least one function identifier; and
    generating a resulting group of data based on executing the at least one function on a portion of the data associated with the at least one group identifier, wherein identifying includes comparing the query with a list of group identifiers first and when a match with group identifiers from the list of group identifiers is not determined comparing the query with a list of function identifiers.

16. The method of claim 15, wherein the at least one group identifier comprises a sub-query, wherein the sub-query includes at least one additional group identifier and at least one additional function identifier.

17. The method of claim 16, comprising identifying the at least one additional group identifier and the at least one additional function identifier.

18. The method of claim 17, comprising executing the at least one function and the at least one additional function recursively such that the at least one additional function is executed first and the at least one function is executed second.

19. The method of claim 18, comprising executing the at least one function on data derived from executing the at least one additional function.

20. An apparatus for performing data mining in a database comprising:
  a data store, wherein the data store stores a database;
  a communication module for receiving input from a user and displaying output to the user; and
  a processor, wherein the processor is configured to:
    receive from the communication module a single query, wherein the single query comprises a first function and a plurality of column labels, and in response to the single query, without further user input:
      parse the query to identify the first function and a plurality of columns in the database corresponding to the plurality of column labels;
      apply the first function to the database to obtain a result for the query, wherein the apply comprises applying the first function to at least one column in the plurality of columns to dynamically create a first temporary column; and
      send the result to the communication module, wherein the single query further comprises a second function within the first function, and wherein the applying comprises applying the second function to at least one column in the plurality of columns to dynamically create a second temporary column.

21. The apparatus of claim 20, wherein the data store further stores a library of functions.

22. The apparatus of claim 20, wherein the processor is further configured to train the first function on a training data set.

23. The apparatus of claim 22, wherein a portion of the database comprises the training data set.

24. The apparatus of claim 20, wherein parsing comprises selecting the first function from a library of functions.

25. The apparatus of claim 20, wherein the result comprises a portion of the first temporary column.

26. The apparatus of claim 20, wherein only the portion of the first temporary column is created to obtain the result.

27. A method of performing data mining in a database comprising:
  receiving from a user a single query for a database, wherein the single query comprises a first function and a plurality of column labels, and in response to receiving the single query, without further user input:
    parsing the single query to identify the first function and a plurality of columns in the database corresponding to the plurality of column labels;
    applying the first function to the database to obtain a result for the query, wherein the applying comprises applying the first function to at least one column in the plurality of columns to dynamically create a first temporary column; and
    returning the result to the user, wherein the query further comprises a second function within the first function, and wherein the applying comprises applying the second function to at least one column in the plurality of columns to dynamically create a second temporary column.

* * * * *